(12) United States Patent
Edirisooriya et al.

(10) Patent No.: US 7,640,387 B2
(45) Date of Patent: Dec. 29, 2009

(54) METHOD AND APPARATUS FOR IMPLEMENTING HETEROGENEOUS INTERCONNECTS

(75) Inventors: Samantha J. Edirisooriya, Tempe, AZ (US); Steven J. Tu, Phoenix, AZ (US); Gregory W. Tse, Tempe, AZ (US); Sujat Jamil, Chandler, AZ (US); David E. Miner, Chandler, AZ (US); R. Frank O'Bleness, Tempe, AZ (US); Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/059,838

(22) Filed: Mar. 31, 2008

(65) Prior Publication Data

US 2008/0250168 A1 Oct. 9, 2008

Related U.S. Application Data

(62) Division of application No. 11/027,709, filed on Dec. 28, 2004, now Pat. No. 7,353,317.

(51) Int. Cl.
*G06F 13/00* (2006.01)

(52) U.S. Cl. ........................... 710/317; 710/119

(58) Field of Classification Search ................. 710/110, 710/119, 121, 123, 240–243, 309, 317
See application file for complete search history.

(56) References Cited

U.S. PATENT DOCUMENTS

| | | | | |
|---|---|---|---|---|
| 4,473,880 A | | 9/1984 | Budde et al. | |
| 4,991,084 A | * | 2/1991 | Rodiger et al. | 710/316 |
| 5,857,078 A | * | 1/1999 | Date | 709/234 |
| 5,968,154 A | * | 10/1999 | Cho | 710/119 |
| 6,601,118 B1 | * | 7/2003 | Rooney | 710/56 |
| 6,715,023 B1 | | 3/2004 | Abu-Lebdeh et al. | |
| 6,804,742 B1 | * | 10/2004 | Kitamura et al. | 710/312 |
| 6,928,500 B1 | * | 8/2005 | Ramanujan et al. | 710/107 |
| 6,954,821 B2 | | 10/2005 | Fitzsimmons et al. | |
| 7,013,357 B2 | | 3/2006 | Murdock et al. | |
| 7,039,750 B1 | * | 5/2006 | Regula et al. | 710/317 |
| 7,076,595 B1 | | 7/2006 | Dao et al. | |
| 7,080,186 B2 | * | 7/2006 | Simon et al. | 710/305 |
| 7,117,277 B2 | | 10/2006 | Mathewson et al. | |
| 7,145,903 B2 | * | 12/2006 | Gutierrez | 370/362 |
| 7,353,317 B2 | | 4/2008 | Edirisooriya et al. | |

(Continued)

FOREIGN PATENT DOCUMENTS

EP 0327203 A2 8/1989

(Continued)

*Primary Examiner*—Khanh Dang
(74) *Attorney, Agent, or Firm*—Schwegman, Lundberg & Woessner, P.A.

(57) ABSTRACT

Some embodiments of the invention include an address interconnect and a data interconnect to transfer data among a number of devices. The data interconnect is configured to transfer data among the devices via multiple transfer paths. A transfer of data on one transfer path is independent from a transfer of data on another transfer path. In some cases, data is concurrently transferred among more than two of the devices on at least one of the address interconnect and the data interconnect. Other embodiments are described and claimed.

20 Claims, 5 Drawing Sheets

U.S. PATENT DOCUMENTS

| | | | |
|---|---|---|---|
| 7,395,360 B1 * | 7/2008 | Pritchard et al. | 710/113 |
| 7,426,621 B2 * | 9/2008 | Kommrusch et al. | 711/169 |
| 7,457,890 B2 * | 11/2008 | Baker et al. | 710/20 |
| 7,467,238 B2 * | 12/2008 | Hosoya et al. | 710/22 |
| 2005/0160188 A1 * | 7/2005 | Bogin et al. | 710/1 |
| 2006/0143358 A1 | 6/2006 | Edirisooriya et al. | |

FOREIGN PATENT DOCUMENTS

| | | | |
|---|---|---|---|
| EP | 0327203 B1 | 10/1995 | |
| TW | 0514780 | 12/2002 | |
| TW | 0565753 | 12/2003 | |
| TW | 0594484 | 6/2004 | |
| WO | WO-8909967 A1 | 10/1989 | |
| WO | WO-2006071942 A2 | 7/2006 | |
| WO | WO-2006071942 A3 | 7/2006 | |

* cited by examiner

METHOD AND APPARATUS FOR IMPLEMENTING HETEROGENEOUS INTERCONNECTS

RELATED APPLICATION(S)

This application is a divisional of U.S. application Ser. No. 11/027,709, filed on Dec. 28, 2004 now U.S. Pat. No. 7,353,317, which is incorporated herein by reference.

FIELD

Embodiments of the present invention relate to implementation of interconnecting buses in integrated circuits.

BACKGROUND

An integrated circuit usually has a number of circuit components or devices interconnected together by a bus. The bus often has multiple conductive lines.

Some integrated circuits use only a single bus to transfer data among the devices. In most cases, the single bus may establish only a single transfer path to transfer data between only two devices at any given time. In some of these cases, while the bus is busy transferring data between two devices, other devices may also need to use the bus to transfer data. Since the single bus may establish only a single transfer path between only two devices at a given time, the other devices often need to wait for the bus to finish the current data transfer.

Thus, in some integrated circuits, transferring data among the devices via a single bus may be inefficient.

DESCRIPTION OF EMBODIMENTS

Figure 1:
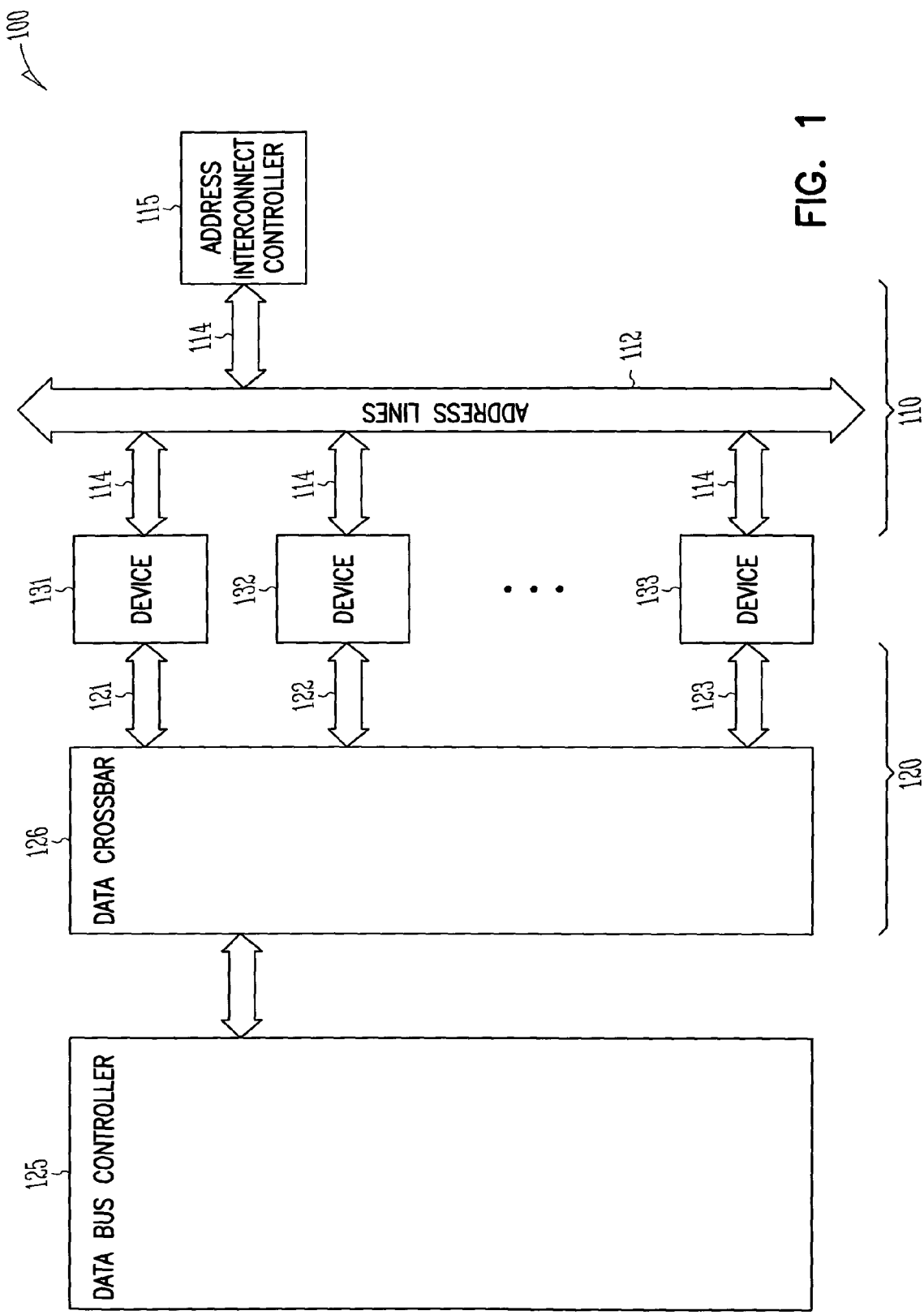
FIG. 1 shows a system having an interconnect structure according to an embodiment of the invention.

The following description and the drawings illustrate some specific embodiments of the invention sufficiently to enable those skilled in the art to practice the embodiments of the invention. Other embodiments may incorporate structural, logical, electrical, process, and other changes. In the drawings, like features or like numerals describe substantially similar components throughout the several views. Examples merely typify possible variations. Portions and features of some embodiments may be included in or substituted for those of others. The scope of the invention encompasses the claims and all available equivalents.

FIG. 1 shows a system having an interconnect structure according to an embodiment of the invention. System 100 includes an address interconnect 110, a data interconnect 120, and a number of devices 131, 132, and 133. An address interconnect controller 115 controls the transfer of data on address interconnect 110. A data interconnect controller 125 controls the transfer of data on data interconnect 120. Address interconnect 110, address interconnect controller 115, data interconnect 120, and data interconnect controller 125 form an interconnect structure to allow devices 131, 132, and 133 to communicate with each other.

In some embodiments, address interconnect 110 includes a multi-drop bus. In other embodiments, address interconnect 110 includes a point-to-point bus.

FIG. 1 shows three devices 131, 132, and 133 as an example. In some embodiments, the number of devices is different from three. In some embodiments, system 100 is formed on a single integrated circuit chip.

In some embodiments, at least one of the devices 131, 132, and 133 includes an integrated circuit. In an embodiment, examples of the devices 131, 132, and 133 include one or more of processing unit core, a memory interface controller, a direct memory access controller, and peripheral bus bridge controller. Each of the devices 131, 132, and 133 has a device identification. The device identification of one device is different from the device identification of another device. In some embodiments, the device identification of each of the devices is assigned during an initialization process of system 100.

Address interconnect 110 includes address lines 112 and circuit interfaces 114. Each of the circuit interfaces 114 includes multiple transmission lines for transferring data among devices 131, 132, and 133 via address interconnect 110. Examples of the data on address interconnect 110 include address information and command information. In this specification, the data on address interconnect 110 is also referred to as communication information. In some embodiments, address information on address interconnect 110 refers to memory locations in devices 131, 132, and 133. Command information includes device identifications of devices 131, 132, and 133, transaction type such as read transaction or write transaction, and other information associated with data transactions among devices 131, 132, and 133.

Data interconnect 120 includes a data crossbar 126 coupled to circuit interfaces 121, 122, and 123. Each of the circuit interfaces 121, 122, and 123 includes multiple transmission lines coupled to one of the devices 131, 132, and 133. Based on the communication information on address interconnect 110, devices 131, 132, and 133 transfer data among each other on data interconnect 120 via circuit interfaces 121, 122, and 123 and data crossbar 126. Examples of the data transferred on data interconnect 120 include data read from memory locations of the devices 131, 132, and 133 and data to be written into memory locations of devices 131, 132, and 133.

As shown in FIG. 1, system 100 includes address interconnect 110, and data interconnect 120 separated or decoupled from address interconnect 110. The separation between address interconnect 110 and data interconnect 120 allows communication information transferred on address interconnect 110 and data transferred on data interconnect 120 to occur concurrently.

Some conventional systems transfer both communication information and data using a single bus. In some of these conventional systems, the single bus may transfer communication information only or data only at any given time. FIG. 1, since system 100 may transfer communication information and data concurrently on both an address interconnect and a data interconnect separated from the address interconnect, system 100 may be more efficient than a conventional system.

Further, data crossbar 126 of system 100 is configured to allow more than one transfer paths to be established at a given time to transfer data between more than two of the devices.

Therefore, system 100 may have a higher data transfer rate than that of a conventional system with a single bus.

In system 100, each of the devices 131, 132, and 133 may be a master (initiator) device, a target device, or both master and target (master/target) device. A master device may request data from a target device. The target device is unable to request data from another device; the target device only provides data when the data is requested by another device. A master/target device is capable of both requesting data from another device and providing data to another device. Devices 131, 132, and 133 in system 100 may include any combination of master, target, and master/target devices.

As described above, the communication information includes a transaction type such as a read transaction or a write transaction. In a read transaction, one device requests to read data from another device. In a write transaction, one device requests to write data into another device. For example, in a read transaction, device 131 may request to read data from device 132. In this example, devices 131 and 132 communicate with each other by transferring communication information on address interconnect 110. Based on the communication information on address interconnect 110, device 132 provides data to device 131 via data interconnect 120. As another example, in a write transaction, device 131 may request to write data to device 133. In this example, devices 131 and 133 communicate with each other by transferring communication information on address interconnect 110. Based on the communication information on address interconnect 110, device 131 provides data to device 133 via data interconnect 120.

The read transaction and the write transaction among devices 131, 132, and 133 in system 100 may occur concurrently on multiple transfer paths of data interconnect 120. For example, data interconnect 120 may concurrently establish a first transfer path and a second transfer path to transfer the data associated with a read transaction between devices 131 and 132 via the first transfer path and to transfer the data associated with a write transaction between devices 131 and 133 via the second transfer path. In some embodiments, the transfer of data on the multiple transfer paths occur concurrently with a transfer of communication information on address interconnect 110

Figure 2:
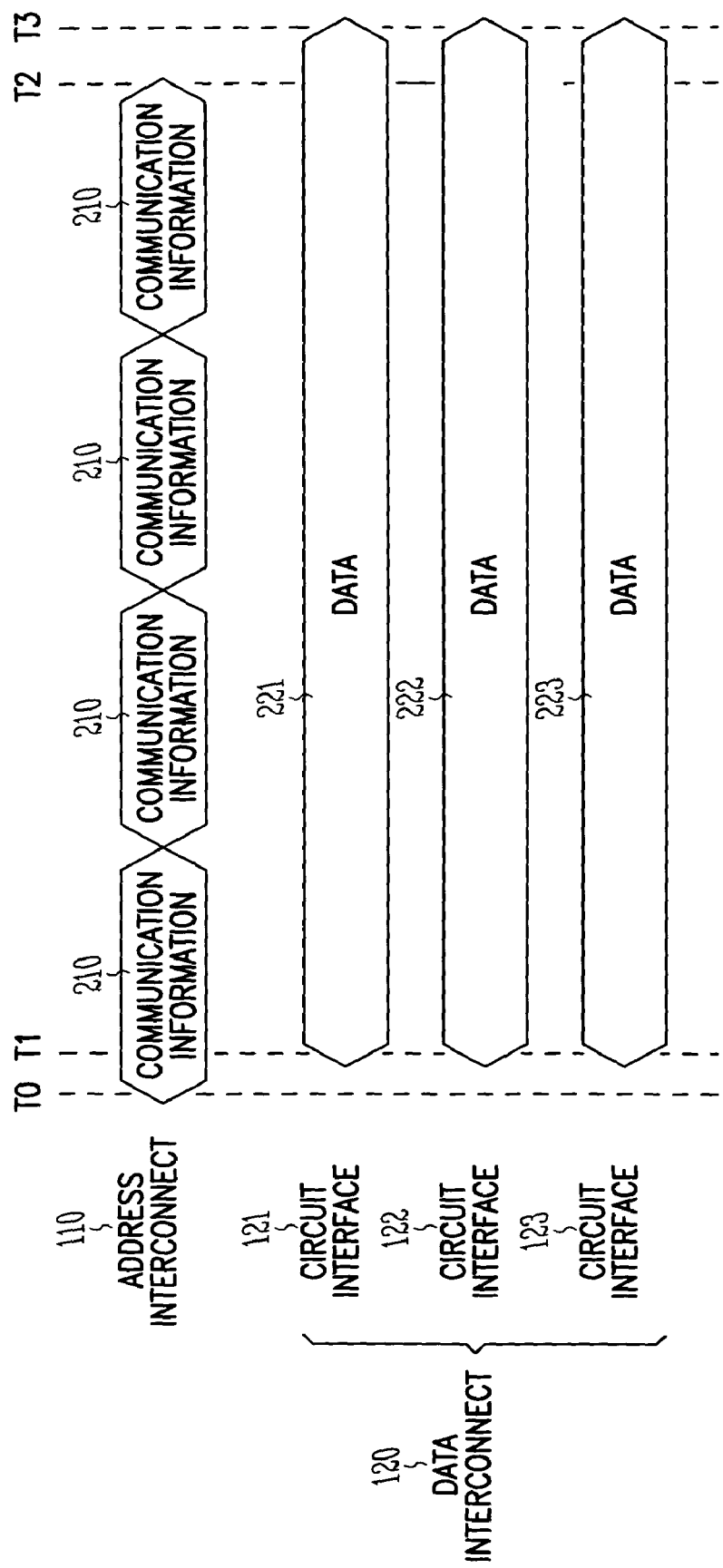
FIG. 2 is an exemplary timing diagram showing a concurrence of communication information transferred on an address interconnect and data transferred on a data interconnect of the system of FIG. 1.

FIG. 2 is an exemplary timing diagram showing a concurrence of communication information transferred on an address interconnect 110 and data transferred on data interconnect 120 of system 100 of FIG. 1. In FIG. 2, T0, T1, T2, and T3 represent times. Address interconnect 110 transfers communication information between times T0 and T2. Data interconnect 120 transfers data between times T1 and T3. The data transferred on each of the circuit interfaces 121, 122, and 123 represent the data transferred among the devices 131, 132, and 133 (FIG. 1) via crossbar 126. The data transferred on circuit interfaces 121, 122, and 123 of FIG. 2 also represents the data transferred on separate multiple transfer paths in data interconnect 120.

As mentioned in FIG. 1, the communication information on address interconnect 110 includes address information and command information. In FIG. 2, the communication information includes a plurality of groups (210) of communication information. In some embodiments, each of the communication information groups 210 may include any combination of address information only, command information only, or a combination of both address and command information.

The overlap in time between communication information groups 210 on address interconnect 110 and the data on data interconnect 120 indicates a concurrent transfer of the communication information on address interconnect 110 and the data on data interconnect 120. For example, between times T0-T2 communication information groups 210 are transferred on address interconnect 110 while data 221, 222, and 223 are transferred on data interconnect 120 between times T1-T3. Thus, between times T1 and T2, communication information groups 210 on address interconnect 110 and the data on data interconnect 120 occur concurrently. FIG. 2 also shows that within data interconnect 120, each of the circuit interfaces 121, 122, and 123 is transferring data between times T1 and T3. Hence, data may also be concurrently transferred on multiple transfer paths among more than two of the devices 131, 132, and 133.

In some embodiments, at least one of the communication information groups 210 is associated with a data of a next transaction (read, write, or a combination of both) in which the data of the next transaction is not currently transferred on data interconnect 120. Thus, in some embodiments, while the data of a current transaction is transferred on data interconnect 120, communication information for the next transaction may be transferred on address interconnect 110.

In the exemplary timing diagram of FIG. 2, each of the circuit interfaces 121, 122, and 123 transfers the data during the entire time interval between times T1 and T3. Embodiments exist where one or more circuit interfaces 121, 122, and 123 transfers data only during a portion of the time interval between times T1 and T3.

Figure 3:
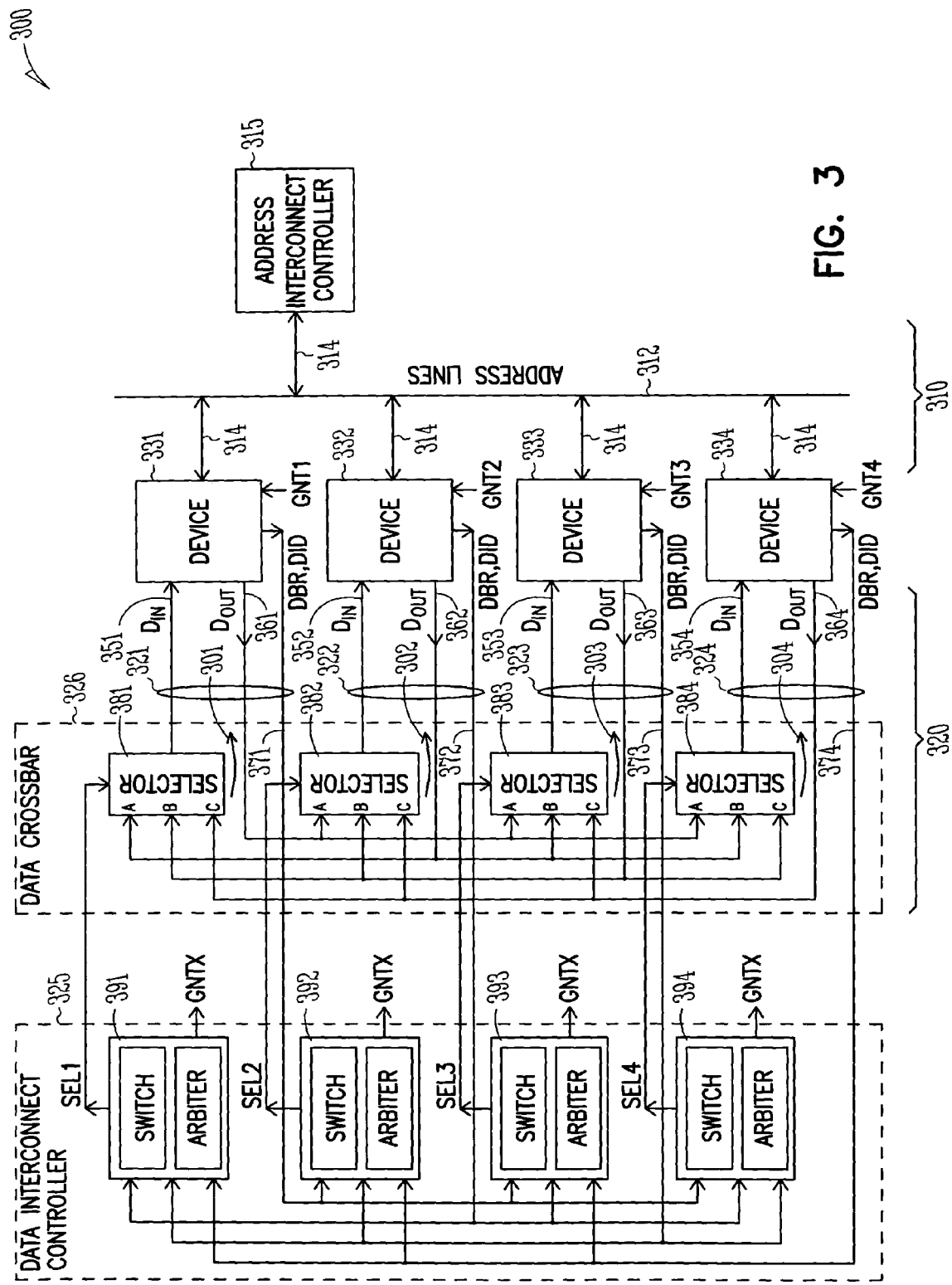
FIG. 3 shows a system having an interconnect structure according to another embodiment of the invention.

FIG. 3 shows a system having an interconnect structure according to another embodiment of the invention. All or a portion of system 300 may be interchanged with all or a portion of system 100 of FIG. 1. In FIG. 3, system 300 includes an address interconnect 310, a data interconnect 320, and a number of devices 331, 332, 333, and 334. An address interconnect controller 315 controls the transfer of data on address interconnect 310. A data interconnect controller 325 controls the transfer of data on data interconnect 320. Address interconnect 310, address interconnect controller 315, data interconnect 320, and data interconnect controller 325 form an interconnect structure to allow devices 331, 332, 333, and 334 to communicate with each other. In some embodiments, address interconnect 310 includes a multi-drop bus. In other embodiments, address interconnect 310 includes a point-to-point bus.

FIG. 3 shows four devices 331, 332, 333, and 334 as an example. The number of devices may be different from four. In some embodiments, system 300 is formed on a circuit die of a single chip.

In some embodiments, at least one of the devices 331, 332, 333, and 334 includes an integrated circuit. Each of the devices 331, 332, 333, and 334 may be a master device, a target device, or a master/target device. System 300 shows each of the devices 331, 332, 333, and 334 being a master/target device. In some embodiments, devices 331, 332, 333, and 334 may include any combination of master, target, and master/target devices. Each of the devices 331, 332, 333, and 334 includes a device identification. The device identification of one device is different from the device identification of another device. In some embodiments, the device identification is assigned to each of the devices in an initialization process of system 300.

Address interconnect 310 includes address lines 312 and circuit interfaces 314. Each of the circuit interfaces 314 includes multiple transmission lines coupled to one of the devices 331, 332, 333, and 334. The data on address interconnect 310 is also referred to as communication information including information such as address information, device identifications of devices 331, 332, 333, and 334, transaction type (read or write), and other information associated with data transactions among devices 331, 332, 333, and 334.

Data interconnect 320 includes a data crossbar 326 coupled to circuit interfaces 321, 322, 323, and 324. Each of the circuit interfaces 321, 322, 323, and 324 couples to a corresponding device. For example circuit interface 321 couples to device 331. Each of the circuit interfaces 321, 322, 323, and 324 includes multiple lines (transmission lines) for transferring data such as input data $D_{IN}$, output data $D_{OUT}$, request information including a data bus request DBR and a destination identification DID, and a data bus grant command GNT1, GNT2, GNT3, or GNT4. For example, circuit interface 321 includes lines 351, 361, and 371 for transferring $D_{IN}$, $D_{OUT}$, and DBR and DID, and GNT1 respectively. Data bus grant command GNT1 is transferred via circuit interface 371. For clarity, the data bus grant command GNT1 is shown separately from line 371. Circuit interface 322 includes lines 352, 362, and 372. Circuit interface 323 includes lines 353, 363, and 373. Circuit interface 324 includes lines 354, 364, and 374.

In each device, $D_{IN}$ represents data sent to the device. $D_{OUT}$ represents data sent from the device. The request information DBR and DID represent information sent from the device to data interconnect controller 325 to request for an access to transfer data to data interconnect 320. The data bus grant command GNT1, GNT2, GNT3, or GNT4 in each device is sent to the device from data interconnect controller 325 to grant the device an access to data interconnect 320.

In embodiments represented by FIG. 3, data crossbar 326 is implemented as a circuit switch. In these embodiments, the destination identification DID may be sent together with the data bus request DBR.

In some embodiments, data crossbar 326 is implemented as a packet-switch configuration. In some of these embodiments, the destination identification DID may be sent together with the output data $D_{OUT}$. For example, the destination identification DID may be included in the data packet header of the output data.

Each of the lines in FIG. 3 includes a group of lines (multiple lines) for transferring multiple bits of information. For clarity, FIG. 3 shows a group of lines as a single line. For example, line 351 includes a group of lines. However, FIG. 3 shows the group of lines as a single line 351 for clarity.

Data crossbar 326 includes a number of selector circuits 381, 382, 383, and 384, and a number of transfer paths 301, 302, 303, and 304. Each of the transfer paths 301, 302, 303, and 304 represents a path from one of the devices to any other device. Selector circuits 381, 382, 383, and 384 respond to select commands SEL1, SEL2, SEL3, and SEL4 to select from among the transfer paths 301, 302, 303, and 304 to establish a number of selected transfer paths. A selected transfer path is a specific path for transferring data between two selected devices. Devices 331, 332, 333, and 334 transfer data among each other via the selected transfer paths. Each of the selector circuits 381, 382, 383, and 384 responds to a corresponding select command. For example, selector circuit 381 responds to the corresponding select command SEL1. Selector circuit 382 responds to the corresponding select command SEL2. Selector circuit 383 responds to the corresponding select command SEL3. Selector circuit 384 responds to the corresponding select command SEL4. In some embodiments, each of the selector circuits 381, 382, 383, and 384 includes a multiplexer.

Each of selector circuits 381, 382, 383, and 384 has a number of inputs A, B, and C to receive output data $D_{OUT}$ from multiple devices. Based on the value of the corresponding select command, each selector circuit selects one of the inputs A, B, and C to establish a selected transfer path between two selected devices among devices 331, 332, 333, and 334. For example, selector circuit 381 has inputs A, B, and C to receive the output data $D_{OUT}$ from devices 332, 333, and 334. Based on the value of the select command SEL1, selector circuit 381 selects one input from among the inputs A, B, and C and to establish a selected transfer path. For example, when selector circuit 381 selects input A, the selected transfer path is the path between device 332 and device 331 including line 362 coupled to device 332 and line 351 coupled to device 331. As another example, when selector circuit 381 selects input B, the selected transfer path is the path between device 333 and device 331 including line 363 coupled to device 333 and line 351 coupled to device 331.

Selector circuits 381, 382, 383, and 384 independently respond to select commands SEL1, SEL2, SEL3, and SEL4. Thus, each of the selector circuits 381, 382, 383, and 384 independently establishes a selected transfer path between two of the devices 331, 332, 333, and 334. Since data crossbar 326 has multiple selector circuits, multiple selected transfer paths may be established at a given time to transfer data between more than two of the devices 331, 332, 333, and 334. Data crossbar 326 transfers data on one selected transfer path independently from a transfer of data on another selected transfer path. In some embodiments, data crossbar 326 transfers data on one selected transfer path concurrently with a transfer of data one another selected transfer path.

Data interconnect controller 325 responds to the request information from devices 331, 332, 333, and 334 to issue the select commands SEL1, SEL2, SEL3, and SEL4, and a number of data bus grant commands GNTX. As discussed above, selector circuits 381, 382, 383, and 384 respond the select commands SEL1, SEL2, SEL3, and SEL4 to select a number of selected transfer paths to transfer data. Devices 331, 332, 333, and 334 respond to the data bus grant commands GNTX to access data interconnect 320.

Data interconnect controller 325 includes a number of path enable units 391, 392, 393, and 394. Each of the path enable units 391, 392, 393, and 394 controls the selection of one of the selector circuits 381, 382, 383, and 384. Thus, the number of path enable units 391, 392, 393, and 394 is equal to the number of selector circuits 381, 382, 383, and 384 of data crossbar 326. For example, FIG. 3 has four path enable units 391, 392, 393, and 394 and four selector circuits 381, 382, 383, and 384.

Each of the path enable units 391, 392, 393, and 394 includes an arbiter circuit (ARBITER) and a switch circuit (SWITCH). Since each of the path enable units 391, 392, 393, and 394 includes an arbiter circuit and a switch circuit; and the number of path enable units 391, 392, 393, and 394 is equal to the number of selector circuits 381, 382, 383, and 384 of data crossbar 326, the number of the arbiter circuits, the number of the switch circuits, and the number of selector circuits are equal.

The arbiter circuit in each of the path enable units 391, 392, 393, and 394 responds to request information (DBR and DID) from devices 331, 332, 333, and 334 to issue the data bus grant command GNTX to the devices 331, 332, 333, and 334. The switch circuit in one of the path enable units 391, 392, 393, and 394 responds to the request information to issue one of the select commands SEL1, SEL2, SEL3, and SEL4 to one of the selector circuits 381, 382, 383, and 384.

Each arbiter circuit has an identification matching a device identification of one of the devices 331, 332, 333, and 334. For example, the arbiter circuit of path enable unit 391 has an identification matching the device identification of devices 331. The arbiter circuit of each of the path enable units 392, 393, and 394 has an identification matching the device identification of devices 332, 333, and 334, respectively. In some embodiments, the identifications of the arbiter circuits of data interconnect controller 325 are assigned an initialization process of system 300.

As discussed previously, to transfer data on data interconnect 320, a device (331, 332, 332, or 334) sends a request information including a data bus request DBR and a destination identification DID to request an access to transfer data on data interconnect 320. In data controller 325, the arbiter circuit with an identification matching the destination identification DID responds to the request information and issues the data bus grant command GNTX to the requesting device. Thus, depending on the value of the request information (DBR and DID) from lines 371, 372, 373, and 374, the data bus grant command GNTX from each arbiter circuit may correspond to any one of the GNT1, GNT2, GNT3, and GNT4.

For example, when device 331 sends the DBR and the DID in which the DID corresponds to the device identification of device 333, the arbiter circuit of path enable unit 393 responds to the request information and grants device 331 an access to data interconnect 320. In this case, the data bus grant command GNTX from the arbiter circuit of path enable unit 393 is sent to device 331 as GNT1 at device 331. Subsequently, device 331 sends data to line 361. In this example, the switch circuit of path enable unit 393 responds to the request information and issues the select command SEL3 to selector circuit 383. Subsequently, selector circuit 383 established a selected transfer path to transfer data from device 331 to device 333.

As shown in FIG. 3, each arbiter circuit may receive request information from multiple devices. Thus, each arbiter circuit may grant request to multiple devices to access the bus (data interconnect) at different times. Each arbiter circuit performs an arbitrating function to grant the bus access to a device based on the request information provided by devices 331, 332, 333, and 334.

Each arbiter performs the arbitrating function based on an arbitration algorithm. The arbiter circuits of path enable units 391, 392, 393, and 394 perform the arbitrations independently from each other. In some embodiments, each of the devices 331, 332, 333, and 334 may be assigned a priority by system 100. Each arbiter circuit may use an algorithm such as a fixed priority, a rotational priority, or a combination of both to grant access to the devices based on the priority assigned to each device.

System 300 may establish multiple selected transfer paths at any given time to transfer data between more than two devices in a read transaction, in a write transaction, or in a combination of both read and write transactions. For example, devices 333 may receive data from device 331 via line 353 ($D_{IN}$) in a read transaction via a first selected transfer path while device 333 may also send data via line 363 ($D_{OUT}$) to device 334 in a write transaction via a second selected transfer path. In this example, two different path enable units 393 and 394 independently control the transfer of data on two different selected transfer paths. Path enable unit 393, in this example, controls the transfer of data on the first selected transfer path in the read transaction between devices 333 and 331. Path enable unit 394, in this example, controls the transfer of data on the second selected transfer path in the write transaction between devices 333 and 334. The following description describes the process of the read transaction between device 333 and device 331 and the process of the write transaction between devices 333 and 334 according to the example above.

In the read transaction between devices 333 and 331, device 333 sends, via address interconnect 310, communication information including a read request and the device identification of device 333. Device 331 claims the read request and sends to device 333, via address interconnect 310, an acknowledgement command and the device identification of device 331. After the communication between devices 331 and 333 is established, device 331 sends to data interconnect controller 325, via line 371, a data bus request DBR and a destination identification DID (the device identification of device 333).

In response to the data bus request DBR and the destination identification DID on line 371, the arbiter circuit with an identification matching the destination identification DID grants a bus access to the requesting device. In this case, since the destination identification is the identification of device 333, the arbiter circuit of path enable unit 393 grants the bus access to device 331 (the requesting device). After receiving the bus access grant, device 331 sends data $D_{OUT}$ to line 361. The switch circuit of path enable unit 393 issues the select command SEL3 to enable the corresponding selector circuit to establish a transfer path to transfer data from device 331 to device 333. In this case, selector circuit 383 selects transfer path 303 to transfer the $D_{OUT}$ data on line 361 from device 331 via transfer path 303 to device 333. The $D_{IN}$ data on line 353 at device 333, in this case, represents the $D_{OUT}$ data from device 331.

In the write transaction between devices 333 and 334, device 333 sends, via address interconnect 310, communication information including a write request and the device identification of device 334. Device 334 claims the write request and sends to device 333, via address interconnect 310, communication information including an acknowledgement command and the device identification of device 334. After receiving the communication information from device 334, device 333 sends to data interconnect controller 325, via line 373, a data bus request DBR and a destination identification DID (the device identification of device 334).

In response to the data bus request DBR and the destination identification DID on line 373, the arbiter circuit with an identification matching the destination identification DID grants a bus access to requesting device. In this case, since the destination identification is the identification of device 334, the arbiter circuit of path enable unit 394 grants a bus access to device 333 (requesting device). After receiving the bus access grant, device 333 sends data $D_{OUT}$ to line 363. The switch circuit of path enable unit 394 issues the select command SEL4 to enable the corresponding selector circuit to establish a transfer path to transfer data from device 333 to device 334. In this case, selector circuit 384 selects transfer path 304 to transfer the $D_{OUT}$ data on line 363 from device 333 via transfer path 304 to device 334. The $D_{IN}$ data on line 354 at device 334, in this case, represents the $D_{OUT}$ data from device 334.

In some embodiments, the transfer of data on data interconnect 320 in the read transaction occurs concurrently with the transfer of data on data interconnect 320 in the write transaction. In the example above, the transfer of data on data interconnect 320 from device 331 to device 333 in the read transaction may occur concurrently with the transfer of data on data interconnect 320 from device 333 to device 334 in the write transaction.

The above example describes a read transaction and a write transaction among three of the devices of system 300. In some embodiment, system 300 may have multiple read transactions, multiple write transactions, or any combination of read and write transactions between at least two of the devices of system 300. In some embodiments, a transfer of data associated with one or more transaction (read, write, or a combination of both read and write) on data interconnect 320 occurs concurrently with a transfer of data on address interconnect 310.

The constructions of data interconnect 320 and data interconnect controller 325 allow data interconnect 320 to establish multiple transfer paths at any given time to transfer data between more than two devices. Thus, system 300 may have an improved speed over a conventional system in which the convention system may establish only one data transfer path between only two devices at any given time. Further, since each of the path enable units 391, 392, 393, and 394 performs similar functions, path enable units 391, 392, 393, and 394 may have similar circuit constructions. Therefore, the construction of data interconnect controller 325 of system 300 may be simplified.

Figure 4:
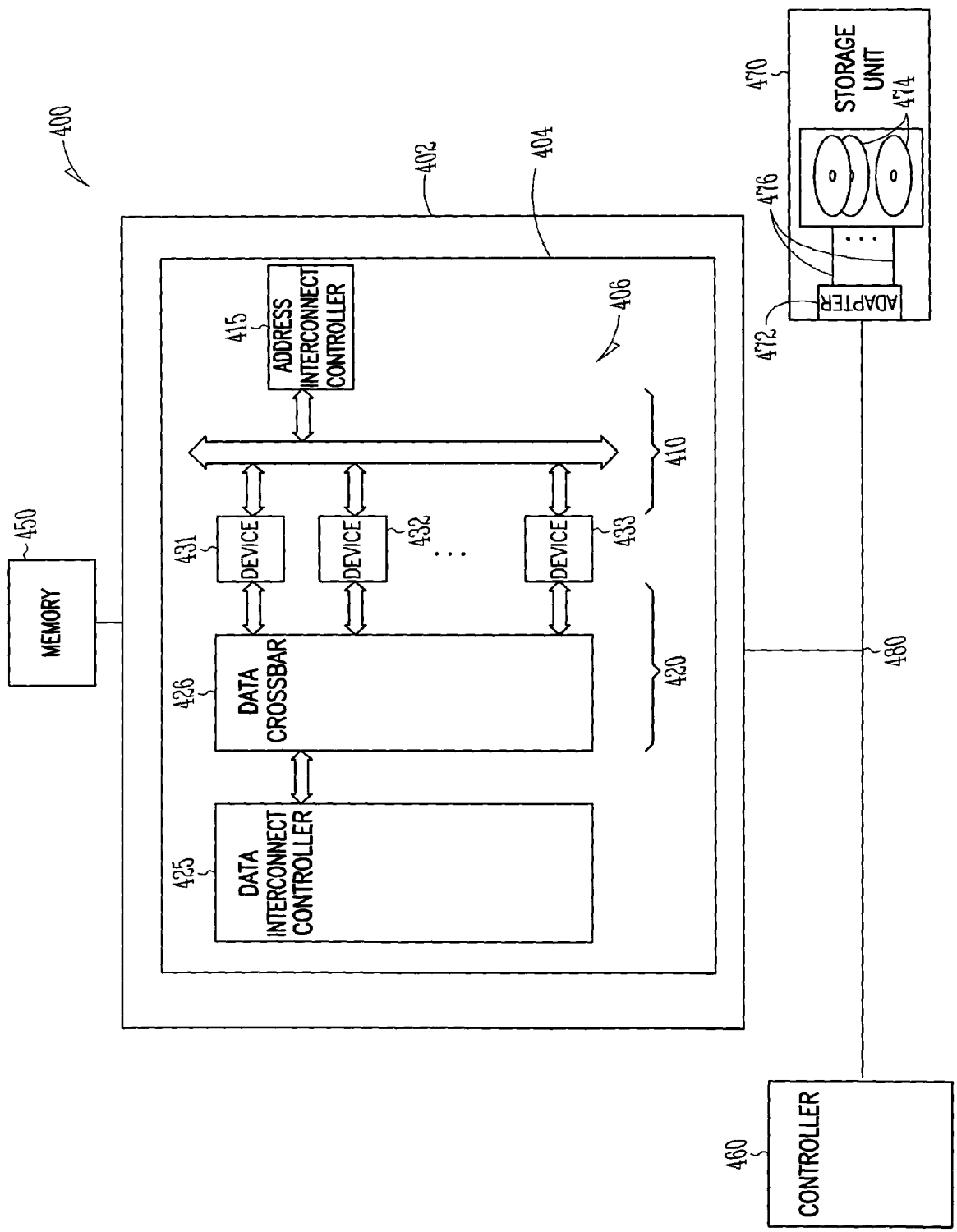
FIG. 4 shows a network including an integrated circuit chip according to an embodiment of the invention.

FIG. 4 shows a network including an integrated circuit chip according to an embodiment of the invention. Network 400 includes an integrated circuit chip 402, a memory device 450, a controller 460, a storage unit 470, and a multi-drop bus 480. Network 400 may be a storage area network in which controller 460 includes a computer or a server.

Integrated circuit chip 402 couples to controller 460 and storage unit 470 via multi-drop bus 480 to transfer data to both controller 460 and storage unit 470.

In some embodiments, integrated circuit chip 402 couples to another chip via a point-to-point bus instead of via a multi-point bus.

Memory device 450 includes a medium to store data. In some embodiments, memory device 450 includes a dynamic random access memory. In other embodiments, memory device 450 includes a flash memory. In some other embodiments, memory device 450 includes a combination of both dynamic random access memory and flash memory.

Storage unit 470 includes an adapter 472 coupled to a number of disks 474 via a number of cables 476. Disks 474 form a redundant array of independent disks (RAID) to store data. Adapter 472 serves as a bridge between multi-drop bus 480 and cables 476. In some embodiments, cables 476 are fiber optic cables. In other embodiments, cables 476 are small computer system interface (SCSI) cables. In some embodiments, adapter 472 is located outside storage unit 470.

Integrated circuit chip 402 includes a circuit die 404, and a system 406 formed on circuit die 404. In some embodiments, circuit die 404 includes semiconductor material such as silicon. System 406 includes an address interconnect 410, a data interconnect 420, and a number of devices 431, 432, and 433. An Address interconnect controller 415 controls the transfer of data on address interconnect 410. A data interconnect controller 425 controls the transfer of data on data interconnect 420. Address interconnect 410 and data interconnect 420 form an interconnect structure to allow devices 431, 432, and 433 to communicate with each other. In some embodiments, system 406 includes system 100 of FIG. 1 and system 300 of FIG. 3. Thus, in some embodiments, system 406 includes circuit structures and functions of system 100 and system 300 described in FIG. 1 through FIG. 3.

Figure 5:
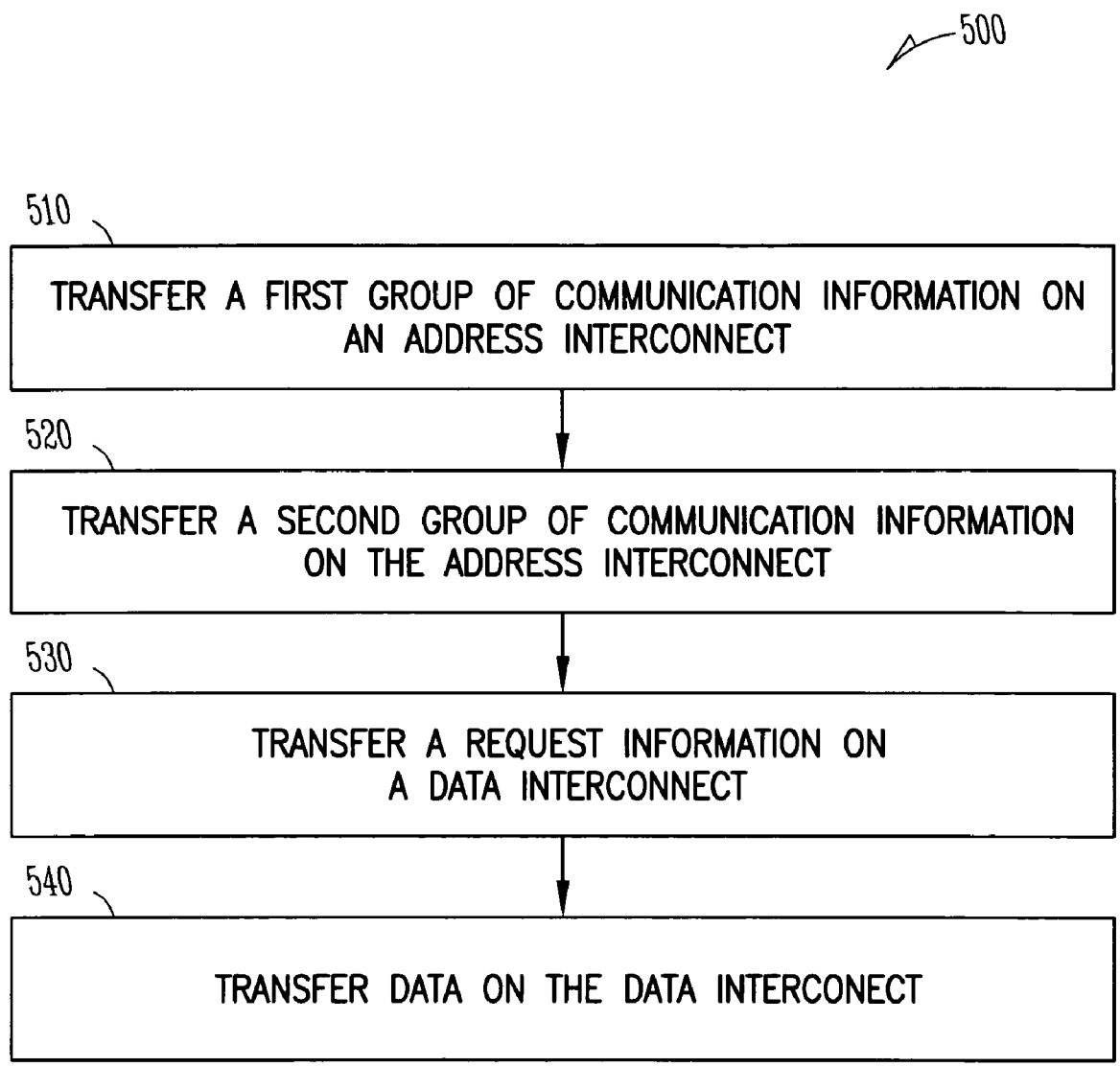
FIG. 5 shows a method of transferring data according to an embodiment of the invention.

FIG. 5 shows a method of transferring data according to an embodiment of the invention. Method 500 transfers data among a number of devices via an interconnect structure in a system. In some embodiments, method 500 is used in system 100 of FIG. 1 and system 300 of FIG. 3. The interconnect structure in method 500 includes at least an address interconnect and a data interconnect. In some embodiments, the address interconnect and the data interconnect in method 500 includes address interconnect 110 and data interconnect 120 of FIG. 1. In other embodiments, the address interconnect and the data interconnect in method 500 includes address interconnect 310 and data interconnect 320 of FIG. 3.

In method 500, box 510 transfers a first group of communication information on the address interconnect. In some embodiments, the first group of communication information is sent to the address interconnect by one of the devices during an address phase. For example, the first group of communication information in box 510 is sent during an address phase by a first device. In this example, the first group of communication information includes the device identification of the first device, memory address of data to be transferred, and a transaction type such as a read transaction or a write transaction.

Box 520 transfers a second group of communication information on the address interconnect. In some embodiments, the second group of communication information is sent to the address interconnect by a second device during an acknowledgement phase. The second group of communication information includes the device identification of the second device and acknowledgement information. The acknowledgement information indicates that the transaction in the first group of communication device is claimed by the second device.

A destination identification is determined. The destination identification corresponds to the identification of either the first device or the second device. In the read transaction in which the first device requests a read of data in the second device, the destination identification is the device identification of the first device. In the write transaction in which the first device requests data to be written into the second device, the destination identification is the device identification of the second device.

In the read transaction, the second device captures and stores the device identification of the first device sent during the address phase in box 510. The second device uses the device identification of the first device as the destination identification during subsequent action of the read transaction so that data is read to the first device (destination). Thus, in the read transaction in this case, the destination identification is the device identification of the first device.

In the write transaction, the first device captures and stores the device identification of the second device sent during the acknowledgement phase in box 520. The first device uses the device identification of the second device as the destination identification during subsequent action of the write transaction so that data is written to the second device (destination). Thus, in the write transaction in this case, the destination identification is the device identification of the second device.

Box 530 transfers request information on the data interconnect. The request information includes a data bus request and the destination identification. Depending on the transaction type, the data bus request and the destination identification are sent to the data interconnect by either the first device or the second device. In the read transaction in which the first device requests a read of the data in the second device, the data bus request and the destination identification are sent to the data interconnect by the second device. In the write transaction in which the first device requests a data to be written into the second device, the data bus request and the destination identification are sent to the data interconnect by the first device. The device that sends the data bus request and the destination identification to the data interconnect is referred to as the data provider. The data bus grants a bus access to the data provider (first device or second device) based on the information represented by data bus request and the destination identification. After the bus access is granted, the data interconnect establishes a transfer path to transfer data between the data provider (for example, the first device) and the device identified by the destination identification (for example, the second device).

Box 540 transfers data via the data interconnect to the device identified by the destination identification. The data transferred to the device identified by the destination identification is provided by the data provider mentioned in box 530. As described in box 530, the data provider may be either the first device or the second device. In the read transaction in which the first device requests a read of the data in the second device, the data provider is the second device. In the write transaction in which the first device requests a data to be written into the second device, the data provider is the first device.

FIG. 5 describes a read transaction or a write transaction between two devices (first device and second device). In some embodiments, method 500 transfers on the data interconnect data associated with multiple transactions. The multiple transactions include any combination of read and write transactions. The data associated with the multiple transactions are transferred on a plurality of selected transfer paths within the data interconnect. In some embodiments, data associated with the plurality of transactions are concurrently transferred on the selected transfer paths within the data interconnect.

The above description is intended to be illustrative, and not restrictive. Many other embodiments will be apparent to those of skill in the art upon reading and understanding the above description. Therefore, the scope of the invention should be determined with reference to the appended claims, along with the full scope of equivalents to which such claims are entitled.

What is claimed is:

1. A network comprising:
a multi-drop bus to transfer data; and
an integrated circuit chip coupled to the multi-drop bus, the integrated circuit chip including a plurality of devices, a data crossbar including a plurality of transfer paths coupled to the devices, and a data interconnect controller coupled to the devices and to the data crossbar, the data interconnect controller including a plurality of arbiter circuits to allow data to be independently transferred on the transfer paths, the plurality of devices including a first device, a second device, and a third device, the data crossbar also including a first selector circuit, a second selector circuit, and a third selector circuit, the first selector circuit including first inputs to receive data from the second and third devices and an output to provide data to the first device based on data selected at the first inputs, the second selector circuit including second inputs to receive data from the first and third devices and an output to provide data to the second device based on data selected at the second inputs, and the third selector circuit including third inputs to receive data from the first and second devices and an output to provide data to the third device based on data selected at the third inputs.

2. The network of claim 1, wherein the first, second, and third selector circuits are configured to select from among the transfer paths to establish a selected number of the transfer paths among a selected number of the devices.

3. The network of claim 2, wherein the data interconnect controller further includes a plurality of switch circuits responsive to request information from the first, second, and third devices to enable the first, second, and third selector circuits to independently select from among the transfer paths.

4. The network of claim 1, wherein the data crossbar is configured to allow data from at least two of the plurality of devices to be concurrently sent to the data crossbar.

5. The network of claim 1 further comprising a storage unit coupled to the multi-drop bus, wherein the storage unit includes a redundant array of independent disks to store data.

6. The network of claim 5, wherein the storage unit further includes a plurality of fiber optic cables coupled between the redundant array of independent disks and the multi-drop bus.

7. The network of claim 1, wherein the data crossbar is configured to allow data from the first, second, and third devices to be concurrently sent to the data crossbar.

8. A network comprising:
a bus to transfer data; and
an integrated circuit chip coupled to the bus, the integrated circuit chip including:
a first device, a second device, and a third device;
an address interconnect coupled to the first, second, and third devices to transfer a plurality of groups of communication information among the first, second, and third devices; and
a data interconnect coupled to the first, second, and third devices, the data interconnect including a data crossbar to transfer data among the first, second, and third devices based on the communication information on the address interconnect, the data crossbar configured to transfer a third device data from the third device to the data interconnect, wherein the third device data is sent to the first device when the third device indicates the third device data is for the first device, and wherein the third device data is sent to the second device when the third device indicates the third device data is for the second device.

9. The network of claim 8, wherein the integrated circuit chip further includes a data interconnect controllers to allow a transfer of the data on the data interconnect to occur concurrently with a transfer of at least one of the groups of communication information on the address interconnect.

10. The network of claim 9, wherein the data interconnect controller is configured to allow at least two of the first, second, and third devices to currently send data to the data interconnect.

11. The network of claim 9, wherein the data interconnect controller includes a plurality of arbiter circuits to perform a plurality of arbitrating functions to allow the first, second, and third devices to concurrently transfer data on the data interconnect.

12. The network of claim 8, wherein the data crossbar includes a number of multiplexers to establish selected transfer paths among the first, second, and third devices via the data crossbar.

13. The network of claim 12, wherein the data interconnect controller includes a number of arbiter circuits responsive to request information from the first, second, and third devices to perform a plurality of arbitrating functions, and a number of switch circuits responsive to request information from the first, second, and third devices to enable the multiplexers to establish the selected transfer paths.

14. The network of claim 13, wherein the number of the arbiter circuits, the number of the switch circuits, and the number of the multiplexers are equal.

15. A method comprising:
transferring data between a bus and an integrated circuit chip, the integrated circuit chip including a first device, a second device, a third device, a data crossbar including a plurality of transfer paths coupled to the first, second, and third devices, and a data interconnect controller coupled to the first, second, and third devices and to the data crossbar, the data interconnect controller including a plurality of arbiter circuits to allow data to be independently transferred on the transfer paths, the plurality of devices including a first device, a second device, and a third device, the data crossbar also including a first selector circuit, a second selector circuit, and a third selector circuit, wherein transferring the data includes:

receiving data from the second and third devices at first inputs of the third selector and providing data from an output of the first selector to the first device based on data selected at the first inputs;

receiving data from the first and third devices at second inputs of the second selector and providing data from an output of the second selector to the second device based on data selected at the second inputs; and receiving data from the first and second devices at third inputs of the first selector and providing data from an output of the third selector to the third device based on data selected at the third inputs.

16. The method of claim 15, wherein transferring the data includes transferring a first data between the first and second devices and transferring a second data between the second and third devices concurrently with the transferring of first data between the first and second devices.

17. The method of claim 16, wherein transferring the data includes transferring a third data between the first and third devices concurrently with the transferring of first data between the first and second devices.

18. The method of claim 15 further comprising:

transferring a plurality of groups of communication information on the address interconnect for communication among the first, second, and third devices; and sending a request information to request a transfer of data on the data interconnect, wherein the request information is based on communication information from at least one of the groups of communication information.

19. The method of claim 15 further comprising:

performing a first arbitrating function to grant an access to one of the first and second devices to transfer data on the data interconnect; and performing a second arbitrating function to grant an access to one of the first, second, and third devices to transfer data on the data interconnect.

20. The method of claim 19, wherein the first arbitration function is performed by a first arbiter circuit of the plurality of arbiter circuits, and wherein the second arbitration function is performed by a second arbiter circuit of the plurality of arbiter circuits.

* * * * *

UNITED STATES PATENT AND TRADEMARK OFFICE
CERTIFICATE OF CORRECTION

PATENT NO. : 7,640,387 B2  Page 1 of 1
APPLICATION NO. : 12/059838
DATED : December 29, 2009
INVENTOR(S) : Samantha J. Edirisooriya et al.

It is certified that error appears in the above-identified patent and that said Letters Patent is hereby corrected as shown below:

On the title page, item (75), in "Inventors", in column 1, line 4, delete "Chandler, AZ" and insert -- Austin, TX --, therefor.

Signed and Sealed this

Twenty-third Day of March, 2010

David J. Kappos
*Director of the United States Patent and Trademark Office*